Patented Nov. 7, 1933

1,934,100

UNITED STATES PATENT OFFICE 1,934,100

PRODUCTION OF NEAT'S-FOOT OIL EQUIVALENTS

Carl Stiepel, Berlin-Charlottenburg, Germany, assignor, by mesne assignments, to Unichem Chemikalien Handels A.-G., Zurich, Switzerland, a corporation of Switzerland No Drawing. Application September 18, 1931, Serial No. 563,669, and in Germany September 14, 1930

5 Claims. (Cl. 87—9)

Certain special oils having a low solidification point are produced from the raw neat's-foot oil by special freezing processes which special oils are used as special neat's-foot oil equivalents. They are used as such or in the form of sulfonation products as lubricating agents for precision machines and in the leather and textile industry as greasing agents.

The special value of these oils lies in their low solidification point which is about −10° C. in the case of the neat's-foot oils and which recommends them for certain special uses.

The specifications as given in the literature on the composition of the neat's-foot oil are not uniform but they agree in that the solidification point of the fatty acids is about 18° C. which is comparatively high and corresponds to 15–20% content of stearic or palmitic acid. If on the other hand an animal fatty acid for example, an oleic acid of the same solidification point is esterified with glycerin, tri-glycerides with a turbidity point slightly above 0° C. are produced. That corresponds with the fact that also olive oil corresponding in its chemical composition with animal oils has a solidification point of about 3° C. although its fatty acids have a solidification point of about 20°.

According to the literature even the pure trioleine is not satisfactory as a neat's-foot oil substitute as it solidifies when stored for a long time at ordinary temperatures to a nontransparent substance.

According to the present invention, it has been found that a neat's-foot oil equivalent also with a low turbidity point may be obtained, if we separate from fatty acids of animal origin or from the pure fatty acids of the sperm oil or from fatty acids of non-drying oils, as for instance olive oil, the solid fatty acids to such an extent, that the turbidity point of the remaining liquid constituents is only about 5° C. or lower and convert the latter by esterifying with glycerin according to well-known processes into triglyceride. The esterification may be conducted for example, in accordance with the process described in "Klimont" The New Synthetic Methods of the Fat Industry, II edition, published by Otto Spamer-Leipzig 1922, pages 1 to 16. Briefly, one molecule of glycerin and three molecules of fatty acids are heated for three to four hours in an atmosphere of carbon dioxide to a temperature of 260° while being constantly stirred.

These products, although in the chemical constitution of their fatty acids, somewhat different from the fatty acid components of neat's-foot oil, have nevertheless the important property of very low turbidity points. It is possible according to the above described process to get a turbidity point of −10° C., an effect which could not be expected comparing the statements in the literature on the constitution of neat's-foot oil especially with respect to the contents of solid fatty acids and the solidification point of the fatty acids in the new mixture.

*Example 1.*—The liquid fatty acid (titer about 4° C.) constituents as derived from lard- (hog fat) fatty acid are esterified with glycerin according to well known processes.

*Example 2.*—The liquid fatty acid as obtained from palm-oil fatty acid (titer about 3° C.) is esterified to triglyceride according to well known processes.

*Example 3.*—The liquid fatty acid as obtained from olive-oil fatty acid with a solidification point of 3° C. is converted to tri-glyceride according to the above.

*Example 4.*—The pure fatty acid as obtained from sperm oil after separating the fatty alcohols is cooled down to about 4° and after filtering the liquid parts obtained, are treated in the same manner as above mentioned.

The neat's-foot oil equivalent products as resulting from the above examples, possess a turbidity point of at least below −5° C. and partially even of −10° C.

I claim:

1. An oil having a turbidity point approximating −5° C. or lower adapted for use as a lubricating oil and for the treatment of leather and textiles consisting of tri-glycerides of that fraction of a mixture of fatty acids derived from material of the group consisting of sperm oil, hog fat, palm oil and olive oil, which fraction has a turbidity point approximating 5° C. or lower.

2. An oil having a turbidity point approximating −5° C. or lower adapted for use as a lubricating oil and for the treatment of leather and textiles consisting of tri-glycerides of a mixture of fatty acids containing as a principal ingredient oleic acid and having a turbidity point approximating 5° C. or lower.

3. An oil having a turbidity point approximating −5° C. or lower adapted for use as a lubricating oil and for the treatment of leather and textiles consisting of tri-glycerides of fatty acids which have a turbidity point approximating 3° C. or lower selected from the group consisting of fatty acids derived from sperm oil, hog fat, palm oil or olive oil.

4. An oil having a turbidity point approximating —5° C. or lower adapted for use as a lubricating oil and for the treatment of leather and textiles consisting of tri-glycerides of that fraction of the mixture of fatty acids derived from sperm oil, which fraction has a turbidity point approximating 5° C. or lower.

5. The method of producing an oil having a turbidity point approximating —5° C. or lower adapted for use as a lubricating oil and for the treatment of leather and textiles, which comprises separating from a mixture of fatty acids the fraction having a turbidity point approximating 5° C. or lower and reacting such fraction with glycerin to produce tri-glycerides.

CARL STIEPEL.